Sept. 4, 1962 T. J. KOCHAVER 3,052,285
TOOL FOR LOOSENING TIRE BEADS
Filed March 16, 1961
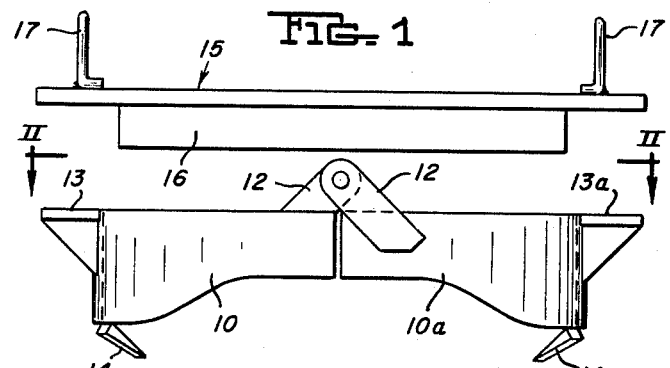
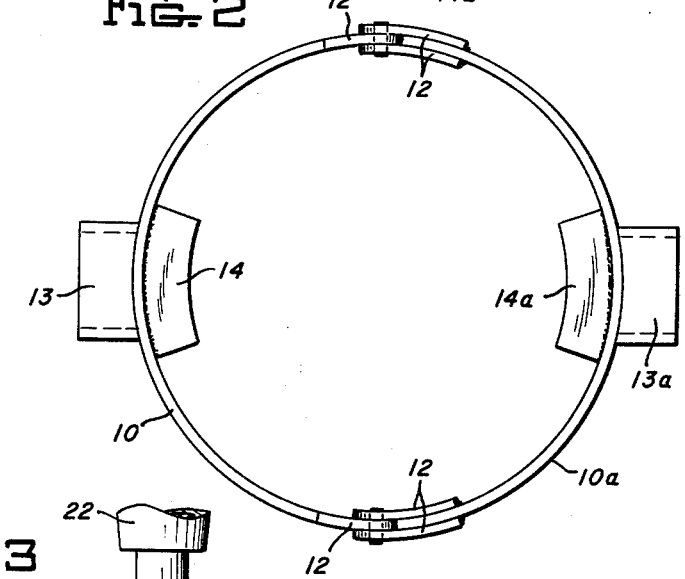
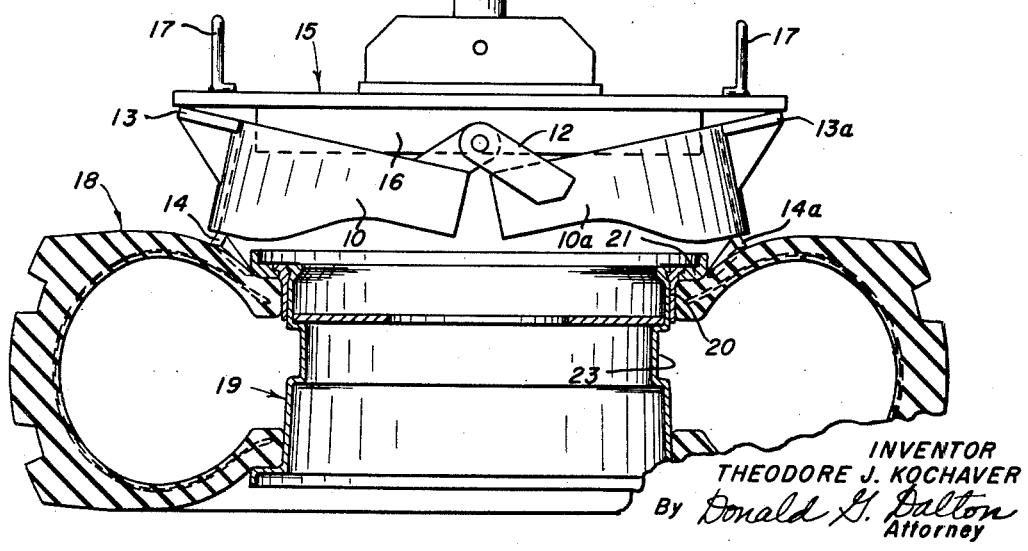
INVENTOR
THEODORE J. KOCHAVER
By Donald G. Dalton
Attorney 3,052,285
TOOL FOR LOOSENING TIRE BEADS
Theodore J. Kochaver, Virginia, Minn., assignor to United
States Steel Corporation, a corporation of New Jersey
Filed Mar. 16, 1961, Ser. No. 96,316
2 Claims. (Cl. 157—1.2)

This invention relates to an improved tool for loosening a tire bead from a rim.

An object of the invention is to provide a tool of simple construction which quickly and easily loosens a tire bead from a rim to enable the tire to be removed.

A further object is to provide a tool of the foregoing type which has a minimum of parts and is inexpensive to manufacture and maintain.

In accomplishing these and other objects of the invention, I have provided improved details of structure, a preferred form of which is shown in the accompanying drawing, in which:

FIGURE 1 is an exploded side elevational view of the tool;

FIGURE 2 is a top plan view of the tool without the bridge taken on line II—II of FIGURE 1; and FIGURE 3 is a side elevational view, partly in section, showing the tool installed on a tire and rim with parts in the position they occupy initially before pressure is applied.

As best shown in FIGURES 1 and 2, the tool of the present invention includes a metal ring formed of two hingedly connected semicircular sections 10 and 10a. At their extremities the sections have rigidly affixed upstanding ears 12 through which the hinged connection is made. The sections have respective rigidly affixed bearing ledges 13 and 13a which project outwardly from their upper edges diametrically opposed from each other and approximately 90° removed from the ears. Beneath the respective bearing ledges, the sections carry rigidly affixed wedges 14 and 14a which project downwardly and inwardly from their lower edges. The tool also includes a bridge 15 separable from the ring 10, 10a. The bridge has a plurality of longitudinal ribs 16 rigidly affixed to its underside and adapted to be received within the ring. Preferably the upper face of the bridge has handles 17.

In FIGURE 3 I show how I use the tool to loosen the bead of a tire 18 from a rim 19. One side of the rim includes a detachable locking ring 20 and a flange ring 21. I lay the tire and rim flat on a floor with the locking ring and flange ring on the side which faces upwardly. I place the ring 10, 10a over the tire and rim with its sections partially open and the tips of the wedges 14 and 14a entering the crevice between the tire 18 and the flange ring 21. Next I place the bridge 15 over the ring 10 and 10a with the underside of the bridge resting on the bearing ledges 13 and 13a, and force the bridge downwardly with a conventional hydraulic ram 22 or the like. The resulting pressure on the ledge drives the wedges between the flange ring 21 and the tire bead.

When the bead breaks, I release the pressure, rotate the tire and rim a quarter revolution, and repeat the foregoing steps. In this manner I force the entire bead into a recess 23 in the circumference of the rim. I then remove the locking ring 20 and the flange ring 21. I turn over the tire and rim and force the bead on the other side away from the rim in the same manner.

From the foregoing description it is seen my invention affords a simple inexpensive tool for quickly and easily removing a tire from a rim. The tool is particularly adapted for use with large equipment, such as 20 inch grader tires. Nevertheless there are no size limitations.

While I have shown and described only a single embodiment of my invention, it is apparent that modifications may arise. Therefore, I do not wish to be limited to the disclosure set forth but only by the scope of the appended claims.

I claim:

1. A tool for loosening a tire bead from a rim comprising a ring formed of a pair of semicircular sections connected for pivotal movement about an axis extending parallel to a diameter of said ring, bearing ledges rigidly affixed to the respective sections and projecting radially outwardly from the upper edges thereof diametrically opposed from each other and approximately 90° removed from the hinged connections, the height of the upper faces of said ledges being at least as great as the adjacent upper edges of the sections from which they project, wedges rigidly affixed to the respective sections and projecting downwardly and inwardly from the lower edges thereof beneath said ledges, and a bridge overlying said ring and resting on said ledges.

2. A tool for loosening a tire bead from a rim comprising a ring formed of a pair of semicircular sections connected for pivotal movement about an axis extending parallel to a diameter of said ring, upstanding ears rigidly affixed to the extremities of said sections through which the hinged connection is made, bearing ledges rigidly affixed to the respective sections and projecting radially outwardly from the upper edges thereof diametrically opposed from each other and approximately 90° removed from said ears, the height of the upper faces of said ledges being at least as great as the adjacent upper edges of the sections from which they project, wedges rigidly affixed to the respective sections and projecting downwardly and inwardly from the lower edges thereof beneath said ledges, and a bridge overlying said ring and bearing against said ledges, whereby forces applied to said bridge force said wedges between a tire bead and a rim.

References Cited in the file of this patent
UNITED STATES PATENTS

| | | |
|---|---|---|
| 2,406,996 | Colley | Sept. 3, 1946 |
| 2,537,041 | Finch | Jan. 9, 1951 |
| 2,749,173 | Peterson | June 5, 1956 |
| 2,796,117 | Pientkewic | June 18, 1957 |